(12) United States Patent
Pinnavaia et al.

(10) Patent No.: US 7,879,311 B2
(45) Date of Patent: Feb. 1, 2011

(54) ZEOLITES WITH UNIFORM INTRACRYSTAL TEXTURAL PORES

(76) Inventors: Thomas J. Pinnavaia, 5901 Sleepy Hollow, East Lansing, MI (US) 48823; Hui Wang, 1519 Spartan Village, Apt. D, East Lansing, MI (US) 48823

( * ) Notice: Subject to any disclaimer, the term of this patent is extended or adjusted under 35 U.S.C. 154(b) by 758 days.

(21) Appl. No.: 11/799,159

(22) Filed: May 1, 2007

(65) Prior Publication Data
US 2007/0258884 A1 Nov. 8, 2007

Related U.S. Application Data

(60) Provisional application No. 60/797,216, filed on May 3, 2006.

(51) Int. Cl.
*C01B 39/04* (2006.01)
(52) U.S. Cl. .................. 423/708; 423/702; 423/705
(58) Field of Classification Search ................ 423/702, 423/705, 708
See application file for complete search history.

(56) References Cited

U.S. PATENT DOCUMENTS

| 4,972,008 | A | 11/1990 | Lee et al. | |
|---|---|---|---|---|
| 6,784,332 | B1 | 8/2004 | Kimble et al. | |
| 7,067,687 | B2 * | 6/2006 | Pinnavaia et al. | 556/450 |
| 7,534,415 | B2 * | 5/2009 | Pinnavaia et al. | 423/625 |
| 2002/0131930 | A1 | 9/2002 | Pinnavaia et al. | |

FOREIGN PATENT DOCUMENTS

WO   WO 03104148    12/2003
WO   WO 2005026050   3/2005

OTHER PUBLICATIONS

Corma, A., Chemical Review 97, 2373-2419(1997).
Aguado et al., Energy and Fuels 1997, 11, 1225-1231.
Bein, T., et al., AngewandteChemie-InternationalEdition 41(14), 2558-2561 (2002).
Martens, J.A., et al., Angewandte Chemie-InternationalEdition 40(14), 2637-2640 (2001).
Martens, J.A., et al., Journal of Physical Chemistry 103(24), 4972-4978 (1999).
Yamamura, M., et al., Zeolites 14, 643-649 (1994).
Vogel, B., et al., Catalysis Letters, 79, 107-112 (2002).
Landau, M.V., et al., Industrial & Engineering Chemistry Research 42, 2773-2782 (2003).
Zhang, P.Q., et al., Catalysis Letters 92, 63-68 (2004).
Schmidt, I., et al, Inorganic Chemistry 39(11), 2279-2283 (2000).
Jacobsen, C.J.H., et al., Chemical Communication 8, 673-674 (1999).
Kim et al., Chemical Communication 15, 1664-1668 (2003).
Tao, Y., et al., Journal of the American Chemical Society 125(20), 6044-6045 (2003).
Groen, J.C., et al., Chemistry-A European journal 11(17), 4983-4994 (2005).
Groen, J.C., et al., Microporousand Mesoporous Materials 87(2), 153-161 (2005).
Jacobsen, C.J.H., et al., Journal of the American Chemical Society 122(29), 7116-7117 (2000).
Janssen, A.H., et al., Microporousand Mesoporous Materials 65(1), 59-75 (2003).
Schmidt, I., et al., Chemistry of Materials 13(12), 4416-4418 (2001).
vanBekkum, H., et al., Chemical Communication 2281-2282 (1997).
vanBekkum, H., et al., Chemistry of Materials 13, 683-687 (2001).
Kaliaguine, S., et al., Angewandte Chemie-InternationalEdition 40(17), 3248-3251 (2001).
Kaliaguine, S., et al., Angewandte Chemie-International Edition 41(6), 1036-1040 (2002).
Yan, Y. et al., Microporous Mesoporous Materials, 17(15), 347-356(2005).
Tatsumi, T. et al. Chemistry of Materials, 17(15), 3913-3920(2005).
Notification of Transmittal of the International Search Report and the Written Opinion of the International Searching Authority, or the Declaration (form PCT/ISA/220) 7 pages, PCT/US2007/10527, dated Oct. 24, 2007.

* cited by examiner

*Primary Examiner*—David M Brunsman
(74) *Attorney, Agent, or Firm*—Scherrer Patent & Trademark Law, P.C.

(57) ABSTRACT

Zeolites with uniform intracrystal textural pores between 1 and 10 nm are described. Intracrystal pores, an alumina source and a silica source are reacted in the presence of a silane modified polymer as a porogen and the reaction product is calcined to form the zeolite. The zeolites are useful in catalytic reactions and adsorption processes.

15 Claims, 5 Drawing Sheets

ZEOLITES WITH UNIFORM INTRACRYSTAL TEXTURAL PORES

CROSS-REFERENCE TO RELATED APPLICATIONS

This application claims benefit to U.S. Provisional Application Ser. No. 60/797,216, filed May 3, 2006, which is incorporated herein by reference in its entirety.

STATEMENT REGARDING FEDERALLY SPONSORED RESEARCH OR DEVELOPMENT

Not Applicable.

BACKGROUND OF THE INVENTION (1) Field of the Invention

The present invention relates to calcined zeolites, which are aluminosilicates, with uniform intracrystal mesopores. In particular, the present invention relates to a process for forming the zeolites by reacting porogens comprising a modified silane, wherein a polymer is covalently linked to silicon in the silane, with a silica source and an alumina source. The present invention also relates to novel porogens. In particular, the present invention relates to calcined zeolite crystals with uniform intracrystal pores of between about 1 and 10 nm in one dimension.

Further, the present invention relates to a process for forming the zeolites by the use of a Si covalently linked organic polymer silane as a porogen in the formation of the zeolite.

(2) Description of the Related Art

Zeolites are crystalline aluminosilicates that are widely used in industry as catalysts and molecular sieves (Corma, A. Chemical Review 97, 2373-2419 (1997)). These materials have crystalline open framework structures with well defined micropore windows that range in size from 0.3 to 1.2 nm, depending on the type of framework structure. Molecules smaller than the pore openings are capable of entering the framework pores. The small framework micropores limit the usefulness of zeolites for catalytic reactions and adsorption processes when the size of the guest molecule is larger than the pore size of the zeolite. Even when the guest molecule is smaller than the framework pore size of the zeolite, the diffusion rate of reactants and products into and out of the channels can be slow, thereby limiting catalytic activity and selectivity.

Open framework structures with pore sizes of a few nanometers, ie., <10 nm, in dimensions are expected to function as size or shape selective catalysts for the conversions of large molecules. For instance, using non-zeolitic mesostructured aluminosilicates for the catalytic cracking of polymeric macromolecules, (Aguado et al., Energy and Fuels 1997, 11, 1225-1231) have shown that uniform mesopores a few nanometers in diameter provide higher yields of liquid fuels than are obtained using the same aluminosilicate composition with much larger and less uniform mesopore distributions. Thus, zeolites with uniform small mesopores or uniform large micropores can be expected to function as selective catalysts for the cracking of large petroleum molecules and other catalytic conversions of large molecules. However, zeolites with these desired pore size properties are unknown. Moreover, the kinds of shape-selective mesostructured aluminosilicates studied by Aguado et al. lack atomic order (i.e. the materials are amorphous) and therefore, lack the desire acidity and hydrothermal stability needed for the efficient cracking of large molecules.

There have been many attempts to provide for zeolites with uniform large micropores (1.2-2.0 nm) or small mesopores (2-10 nm). Efforts to crystallize stable zeolites with framework pores larger than about 1.2 nm have been unsuccessful. Consequently, attention has been directed at introducing textural mesoporosity into known zeolite structures with conventional small framework micropores. Textural porosity is distinct from framework porosity, because it is independent of the crystal structure of the zeolite. The introduction of textural porosity in zeolite compositions has been achieved in many ways. As will become evident from the discussion below; however, the methods disclosed thus far for the introduction of textural porosity in zeolites inevitably results in very broad textural pore size distributions and with average textural pore sizes (>10 nm) that are far larger than is desired for selective large molecule adsorption and catalysis.

One (1) approach to achieving textural pores in zeolites is to make the fundamental crystal size of the zeolite very small, preferably less than 100 nm. Nanosized zeolites can be synthesized in low yields in the form of clear solutions by kinetic control of the crystallization process (Bein, T., et al., Angewandte Chemie-International Edition 41(14), 2558-2561 (2002); Martens, J. A., et al., Angewandte Chemie-International Edition 40 (14), 2637-2640 (2001)), (Martens, J. A., et al., Journal of Physical Chemistry 103(24), 4972-4978 (1999)). If the nanoparticles are subjected to nano-filtration or ultracentrifugation, and isolated in powdered form, the voids formed between the nanoparticles represent textural mesopores. However, the interparticle mesopores have a very broad pore size distribution and the average textural pore size is much larger than 10 nm. The broad mesopore distribution limits and even precludes product or reactant selectivity based on molecular sizes or shape. The value of interparticle mesopores between nanoparticles lies primarily in speeding-up reaction rates through improved molecular diffusion through the framework pores of the crystals. For example, nanosized zeolites have been observed to show higher catalytic performance than conventional monolithic zeolites due to the larger external surface areas and the more rapid diffusion of reactants and products through crystals that are typically smaller than a few hundred nanometers in size. (Yamamura, M., et al., Zeolites 14, 643-649 (1994); Vogel, B., et al., Catalysis Letters, 79, 107-112 (2002); Landau, M. V., et al., Industrial & Engineering Chemistry Research 42, 2773-2782 (2003); and Zhang, P. Q., et al., Catalysis Letters 92, 63-68 (2004)).

Aggregated or intergrown zeolites nanoparticles with interparticle mesopores can be produced by growing the crystals in the nanopores of a carbon template, a process also as zeolite nanocasting. For instance, nanocrystalline ZSM-5 with different crystal sizes were synthesized in the confined spaces provided by a carbon black matrix (Schmidt, I., et al., Inorganic Chemistry 39(11), 2279-2283 (2000); Jacobsen, C. J. H., et al., Chemical Communication 8, 673-674 (1999)). Also, colloid-imprinted carbons have been used as a template for the nanocasting of aggregated and intergrown nano-sized ZSM-5 with fundamental crystal sizes from 12 to 90 nm (Kim et al., Chemical Communication 15, 1664-1668 (2003)). The resulting nanosized zeolite exhibited mesopores that arise from voids between aggregated and intergrown nanocrystals. Although the fundamental crystal size of the resulting nanocasted zeolite is very small, the packing or aggregation of the crystallizes is non-uniform, resulting in interparticle mesopores that also are non-uniform and larger on average than the size of the fundamental particles themselves. In a related approach using carbon aerogel as a template, Tao and co-workers (PCT International Application WO 2003104148;

Tao, Y., et al., Journal of the American Chemical Society 125(20), 6044-6045 (2003)) synthesized ZSM-5 with an average textural mesopore size centered at 11 nm and a width at half height of 3 nm. This is the smallest and narrowest interparticle textural mesoporosity yet reported for a crystalline zeolite.

There are several disadvantages to the nanocasting approach to the formation of interparticle mesoporous zeolites. Firstly, little or no mesoporosity is generated below 5 nm, the size regime most desired for size and shape of selective chemical catalysis. Another disadvantage of carbon templating methods to obtaining nanosized mesoporous zeolites is the need to provide for nanosized carbon templates for forming the nanoparticles and then destroying the carbon template through calcination.

Another strategy to obtaining mesoporous zeolites involves the formation of mesopores within, as opposed to between, zeolite crystals. The intracrystal textural mesoporous zeolites can be achieved by steaming and chemical leaching of monolithic zeolites crystals to remove zeolite mass, leaving behind mesopores. (Groen, J. C., et al., Chemistry-A European Journal 11(17), 4983-4994 (2005); Groen, J. C., et al., Microporous and Mesoporous Materials 87 (2), 153-161 (2005)). These techniques usually produce intracrystal pores much larger than 10 nm. Also, the resultant pores are not especially uniform in diameter.

In yet another approach to the formation of intracrystal mesopores, attention had been focused on the incorporation of carbon nanoparticles into zeolite crystals as they crystallize. The subsequent removal of the occluded carbon particles by calcination results in intracrystal mesopores that replicate the size and shape of the templating carbon. In particular, carbon black particles have been used as a templating agent to form intracrystal mesopores in zeolites (Jacobsen, C. J. H., et al., Journal of the American Chemical Society 122(29), 7116-7117 (2000); Janssen, A, H., et al., Microporous and Mesoporous Materials 65(1), 59-75 (2003)). Carbon nanotubes also have been used as nanoparticle templates for the formation of intracrystal mesopores (Schmidt, I., et al., Chemistry of Materials 13(12), 4416-4418 (2001)). But due to the weak interaction between carbon and a silica matrix, the nanoparticle carbon templates were often extruded out of the zeolite crystal during crystallization, resulting in nanosized zeolite products with interparticle mesoporosity rather than intraparticle mesoporosity. Even when carbon nanoparticles were successfully occluded into the zeolite crystals using special gel processing techniques, the mesopore size distribution could be no better than the particle size fidelity of the occluded carbon nanotubes, which are notorious for forming aggregates with a broad size distribution.

There are two (2) major disadvantages associated with the above approaches to the formation of zeolites with textural mesoporous. The first one is that, with the exception of the zeolite formed by nanocasting in a carbon aerogel (c.f., Tao et al.), the resulting mesopores, whether inter- or intra-particle mesopores, typically are widely distributed in size. The uniformity of mesopore is dependent on the nanocrystal size or the carbon porogens, both of which tend to be irregular in both size and shape. Therefore, the resultant zeolites reflect the same broad distribution of mesopores, which is not suitable for shape or size selective catalytic conversions. Furthermore, even when the mesopore size distributions is comparatively narrow as in the case of zeolites formed through the use of carbon aerogels as templates (c.f., Tao et al), there is little or no pore volume or large micropore range is provided in the 1-2 nm large micropore range or in the 2-10 nm small mesopore domain, which is highly desired for shape or size selective conversions or separations of large molecules. Moreover, little or no textural mesoporosity has yet to be disclosed in the size range below 6 nm, where such mesoporosity is expected to show shape-selectivity in catalytic reactions such as petroleum cracking and refining.

Mesostructured aluminosilicates with ordered networks of uniform pores in the mesopore ranging from 2~50 nm have been considered as potential substitutes for large pore zeolites. However, due to the absence of atomic order in the mesostructured framework walls, these compositions lack the desired hydrothermal stability and acidity for such applications. In an effort to combine the features of zeolites and mesostructured aluminosilicates, van Bekkum and co-workers reported a double-template approach for the synthesis of zeolite—mesostructured aluminosilicate composites. (van Bekkum, H., et al., Chemical Communication 2281-2282 (1997); van Bekkum, H., et al., Chemistry of Materials 13, 683-687 (2001)). Also, Kaliaguine and co-workers used coating and post-synthesis crystallization techniques to form composite mixtures of zeolite nanocrystals dispersed in a mesoporous aluminosilicate support with amorphous framework walls (Kaliaguine, S., et al., Angewandte Chemie-International Edition 40(17), 3248-3251 (2001); Kaliaguine, S., et al., Angewandte Chemie-International Edition 41(6), 1036-1040 (2002)). These composite compositions provide uniform mesoporosity in combination with a zeolite phase, but the phase contributing the mesoporosity is not a zeolite. Thus, dispersing zeolite nanoparticles on mesostructured aluminosilicate supports also does not provide the zeolitic porosity in the desired large micropore to small mesopore range for the selective chemical catalysis of large molecules.

Organosilanes containing small organo groups have been previously incorporated into zeolite structures for the purpose of modifying the chemical or physical surface properties of the zeolite (Yan, Y. et al., Microporous Mesoporous Materials, 17(15), 347-356 (2005); Tatsumi, T. et al. Chemistry of Materials, 17(15), 3913-3920 2005)). Also, organosilanes have been used to prepare nanosized zeolite having increased outer surface area (Aguado, J. et al. WO 2005026050). However, due to the small size of the silane organo group or the inappropriate ratio of polymer weight to silane modifier used in these studies, intra-crystalline textural porosity was neither observed nor anticipated.

OBJECTS

It is an object of the present invention to provide novel zeolites with uniform intracrystal mesopores. Further, it is an object of the present invention to provide novel porogens. Further, it is an object to provide processes for the preparation of the porogens and the zeolites which are economical. These and other objects will become increasingly apparent by reference to the following description and the drawings.

SUMMARY OF THE INVENTION

The present invention relates to a process for forming a calcined zeolite with uniform intracrystal textural pores which comprises: (a) reacting a porogen comprising a silane modified polymer, wherein the polymer is covalently linked to the silane modifier and the mass of polymer per mole of silane modifier is at least 100 grams per mole, in a mixture of an alumina source and a silica source to form a porogen-linked aluminosilicate reaction mixture; (b) digesting the reaction mixture to form zeolite crystals with the silane modified porogen occluded within the crystals; (c) removing the occluded intracrystal porogen from the zeolite crystals by calcination to form the calcined zeolite with the uniform intracrystal pores. Preferably, wherein the zeolite containing the occluded intracrystal porogen is calcined at a temperature between about 500° and 850° C. Most preferably, the porogen is a reaction product of an amine substituted polymer with at least one NH group and an aliphatic epoxy silane. Preferably, the silane is 3-glycidoxypropyl-trimethoxysilane. Further, the polymer is preferably selected from the group consisting of a polyethyenimine and an alpha, omega-polypropylene oxide diamine. Further, the present invention relates to a calcined zeolite with uniform intracrystal textural pores which are about 1 to 10 nm in at least one dimension. Still further, preferably an average pore size value for the intracrystal textural pores is centered between 1 and 10 nm and with the pore size distribution centered around the average pore size value being between 1 and 10 nm. Further, wherein the intracrystal textural pores provide a pore volume of at least 0.05 cc per gram.

Still further, the present invention relates to a process for forming a polymer modified trialkoxysilane which comprises: (a) reacting an amine-substituted polymer containing at least one NH group with an aliphatic epoxy silane in the presence of an organic solvent; and (b) separating the product from the solvent to form the polymer modified silane. Preferably, wherein the invention relates to a polymer modified aliphatic silane with a polymer mass per mole of silane of at least 100 grams per mole of silane. Preferably, the solvents are alcohols containing 1 to 4 carbon atoms. The reaction temperature is between about 80 and 120° C.

Finally, the present invention relates to a process comprising cracking a hydrocarbon feedstock in the presence of a catalyst composition comprising a catalytically active material selected from the group consisting of the zeolite compositions, amorphous aluminosilicates and zeolitic, crystalline aluminosilicates, and a matrix material.

The present provides a process for forming zeolite compositions with uniform intra-crystalline textural pores, particularly in the large micropore range between 1.2-2.0 nm and the small mesopore range between 2 and 10 nm. Moreover, the average textural pore size typically is less than 6 nm, and the average pore volume over the stated large micropore and small mesopore ranges is at least 0.05 cc/g, more typically greater than 0.1 cc/g and even greater than 0.5 cc/g.

Still further, the zeolite compositions of the present invention are ideally suited as a catalyst component for cracking a hydrocarbon feedstock and for use in a process comprising cracking a hydrocarbon feedstock in the presence of the catalyst composition comprising a catalytically active material selected from the group consisting of the zeolite compositions of the present invention, amorphous aluminosilicates and zeolitic crystalline aluminosilicates, and a matrix material.

DESCRIPTION OF PREFERRED EMBODIMENTS

Figure 1:
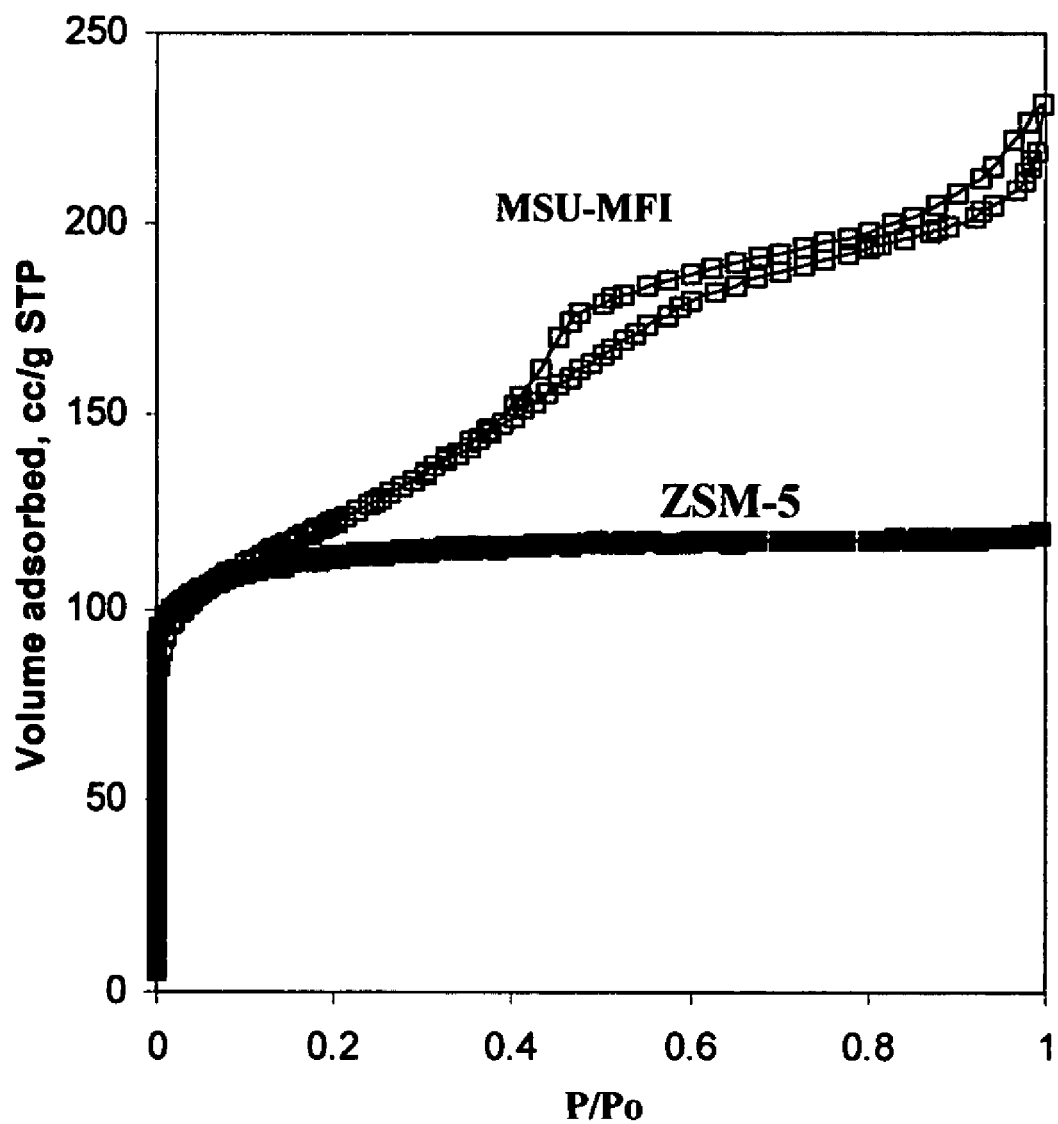
FIG. 1 provides the nitrogen adsorption/desorption isotherms for conventional ZSM-5 zeolite and for MSU-MFI zeolite synthesized according to Example 2 in the presence of the silane-modified polyethyleneimine textural porogen MP-25000(5).

The aluminosilicate compositions described herein are ultra-stable and highly acidic mesoporous materials well suited for the cracking of petroleum molecules and other acid-catalyzed reactions. The approach to generating uniform intracrystal textural pores in zeolite crystals makes use of silane-modified polymers as textural porogens during the synthesis of a desired zeolite framework. The said porogens covalently link to the growing crystal through Si—O—Si linkages and become occluded in the crystal as the crystal continues to grow. The removal of the porogen from the crystallized zeolite by calcination generates the desired intracrystal textural pores.

The ratio of polymer to silane modifier is selected to be effective as a porogen for the formation of textural and intra-crystalline pores in the large micropore range 1.2-2.0 nm and the small mesopore range 2.0-10 nm. The weight of polymer or polymer segment per mole of silane modifying agent is preferably at least about 100 grams of polymer per mole of silane modifier. The silane modifier, the polymer and the linkage between the silane modifier and the polymer are selected to be stable under the basic pH conditions needed to crystallize a zeolite framework. Nitrogen-carbon bonds between the silane modifier and the polymer are preferred linkages, but the present invention is not limited to such linkages.

The silane reagents suitable for modification of polymer porogens are of the type $X_3SiL$, where one or more X groups, preferably all three X groups, are hydrolyzable and effective in forming bridging Si—O—Si linkages to the external surfaces of a growing zeolite crystal during zeolite synthesis. Preferred hydrolyzable X groups are selected from the groups comprising alkoxides or halides. The moiety L of the silane modifier is a non-hydrolyzable organo group linked to silicon through a Si—C covalent bond and is effective in reacting through covalent bond formation with one or more reactive groups on a polymer porogen. The silane group binds to the surface of the growing zeolite crystal during synthesis through Si—O—Si linkage formation and the growing crystal encapsulates the porogen as it continues to grow in size. One (1) or more silane units may be linked to the polymer. The organofunctional group L used to link the polymer porogen to the silane modifier, as well as the polymer porogen itself, is stable to the basic pH conditions used to crystallize the zeolite. Nitrogen—carbon bonds are particularly effective in linking the silane modifier to the polymer or polymer segment. Thus, polymers and silane modifiers effective in forming carbon-nitrogen bonds are preferred. The ratio of polymer mass of at least 100 grams per mole of silane modifier is usually necessary to form intracrystal large micropores and small mesopores. The volume of the resulting intracrystal textual pores is at least 0.05 cc per gram, more typically 0.10-0.30 cc per gram, and even greater than 0.5 cc per gram, depending on the zeolite and the method of preparation. Importantly, for the composition formed by the present art, the volume of the textural porosity in the 1-10 nm pore size range far exceeds any mesopore volume due to pores larger than 10 nm. Still further, in the most preferred embodiment of this invention, the average textural pore size is less than about 7 nm. Moreover, in the preferred form of the invention, the pore volume due to the zeolitic framework micropores and the intracrystal textural pores of the composition amount to at least 80% of the total pore volume in the pore size range below 50 nm. Concentrating the pore volume available for catalytic reaction to the size range below 7 nm, and even below 5 nm for some composition, greatly improves the catalytic selectivity of the zeolite. In comparison, all previously reported forms of mesoporous zeolites have the vast majority of the mesopore volume broadly distributed over pore sizes greater than 10 nm and little or no textural porosity below 10 nm. Such broad distributions of textural pores severely compromises the catalytic selectivity.

The mechanism by which the silane modified polymer functions as a porogen is uncertain. The silane modified polymer may bond to the framework of the growing zeolite in a coiled conformation or it may form micelles that are stabilized through covalent Si—O—Si linkages to the growing zeolite surface. In any case, the result is the encapsulation of the polymer within the zeolite crystal in the form of a porogen. The removal of the encapsulated porogen through calcination affords the desired intracrystal textural pores with the diameters in the large micropore to small mesopore range. The concentration of porogen within the crystal is sufficient to form a network of connected textural pores in the desired size range.

EXAMPLES

The following Examples describe the detailed steps needed to implement the invention:

Example 1

This Example describes the synthesis of silane-modified polymers for use as porogens for the formation of intracrystal textural pores in zeolites. In order to function as effective textural porogens, the weight of polymer per mole of silane modifier was found to be greater than about 100 grams polymer per mole of silicon. Below this level of silane modification, little or no textural porosity in the large micropore to small mesopore range was achieved for the resulting zeolite crystals. 3-glycidoxypropyl-trimethoxysilane (Gelest; Morrisville, Pa.) was used as the silane modifier. The polymers for modification included polyethylenimines with average molecular weights of 25000 (Aldrich), 10000, 1800, 600 (Alfa Aesar; Kavkruke, Germany) and alpha, omega-polypropylene oxides diamines with molecular weights of about 400, 2000, and 4000. The latter polymers are commercially available under the trade names Jeffamine D400, D2000, and D4000, respectively. These combinations of silane modifier and polymer afforded polymers with C—N carbon bonds that are stable under the basic pH conditions and temperatures needed for the synthesis of zeolites. However, the art is not limited to silane modifiers containing C—N bonds. Any linkage between the silane modifier and the polymer that is stable to zeolite synthesis conditions are suitable linkages for the preparation of effective porogens for the introduction of intracrystalline textural mesopores in zeolites.

The polymer and modifier were dissolved into ethanol, which is used as solvent. The epoxy moiety on the silane modifier and the primary amino group were allowed to react at elevated temperature to form C—N between modifier and polymer. In a typical synthesis, the silane modifier and the polymer were dissolved in ethanol and the solution was heated in a sealed glass reactor at 100° C. for 24 hours. The ethanol was then removed under vacuum. The resulting silane-modified polymer was subsequently used as a textural porogen in the synthesis of a zeolite.

For silane modification of polyethylenimine polymers, the molar ratio of glycidoxypropyl-trimethoxysilane modifier to imine unit in the polymer was in the range 5 to 10, corresponding to 220 to 2200 grams of polymer per mole of silane modifier. For the synthesis of silane-modified α,ω-diaminopolypropyleneoxide polymers, the molar ratio of silane modifier to amino group in the polymer was 2:1 and the molecular weight of the polymer was in the range 400 to 4000. In a typical example of the synthesis of a silane-modified Jeffamine polymer, 0.50 grams of 3-glycidoxypropyl-trimethoxysilane (2.12 mmol) and 2.12 g of Jeffamine D-4000 (0.53 mmol) were dissolved in 8 g ethanol. The solution was heated to 100° C. for 24 hours and then the ethanol was removed by applying vacuum in order to obtain the silane-modifier polymer. The silane-modified polymers derived from Jeffamine polymers were denoted MP-D400, MP-D2000, MP-D4000, and those derived from polyethyleneimines were denoted MP-600(x), MP-1800(x), MP-10000(x), and MP-25000(x), whereas x presents the N—H/silane ratio.

Example 2

This Example illustrates the synthesis of a ZSM-5 zeolite containing uniform textural mesopores using silane-modified polyethylenimines as the textural porogen. Tetraethylorthosilicate (TEOS) was the silica source, aluminum isobutoxide was the alumina source, and tetrapropylammonium hydroxide (TPAOH) was used as the templating agent for the ZSM-5 framework.

The silane-modified polymer MP-25000(5) was dissolved in TPAOH solution. To the resulting solution, was added TEOS and aluminum isobutoxide under vigorous stirring. The reaction composition was as follows: 1.00 mole $SiO_2$ in the form of TEOS; 0.01 $Al_2O_3$ in the form of aluminum isobutoxide; 0.37 moles TPAOH; 20 moles $H_2O$; 4 moles EtOH derived from the hydrolysis of TEOS; 0.10 silicon in the form of silane modified polyethyleneimine porogen MP-25000 (5). The mixture was then transferred into a Teflon-lined autoclave and heated to 150° C. for 48 hours. The product washed, dried, and calcined at 600° C. for 4 hours. The final product was denoted MSU-MF1.

FIG. 1 compares the nitrogen adsorption/desorption isotherms of mesoporous MSU-MFI with the nitrogen isotherms for conventional ZSM-5 zeolite. The increase in nitrogen uptake for the mesoporous MSU-MFI zeolite over the partial pressure range starting at about 0.10-0.15 and ending at about 0.80, along with the associated hysteresis loop in the desorption isotherm over this partial pressure range, is attributed to the presence of intracrystal textural mesoporosity. The conventional form of the zeolite shows little or no nitrogen adsorption over this partial pressure range. The nitrogen uptake for both samples below a partial pressure of about 0.10 is due to the filling of the micropores provided by the crystalline framework structure of the zeolite. The nitrogen uptake and hysteresis loop for the MSU-MFI sample above a partial pressure of about 0.80 is assigned to interparticle mesopores formed between small zeolite crystals. Note that the pre volume at a partial pressure of 0.80 is distributed between the framework micropores of the zeolite (~60%) and the intracrystal textural pores formed by the silane modified porogen (~40%). These latter two (2) types of pore networks account for more than 80% of the total porosity observed up to a nitrogen partial pressure of 0.99.

Figure 2A:
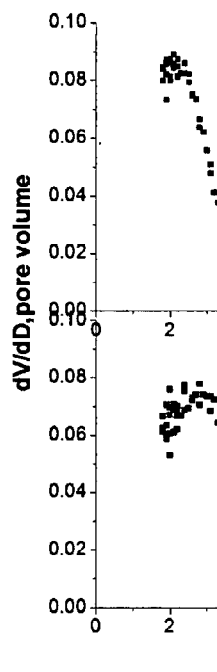
FIGS. 2A to 2D are graphs showing the BJH textural pore size distributions for MSU-MFI zeolites synthesized with silane-modified polyethyleneimine porogens of differing molecular weight: (A) MP-600(5); (B) MP-1800(5); (C) MP-10000(5); (D) MP-25000(5) according to Example 2. For each zeolite synthesis, the molar ratio of silicon in the form of TEOS to silicon in the form of silane-modified porogen was 1.0:0.10.
Figures 2B, 2C, 2D:
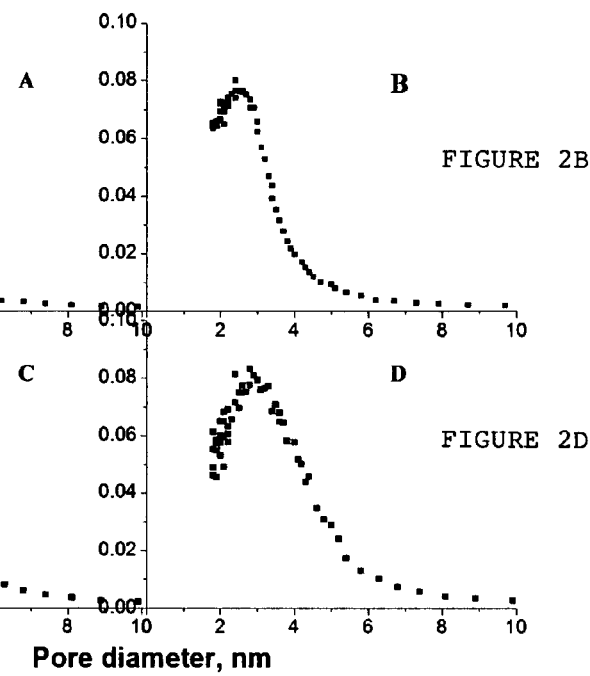
Figure 3:
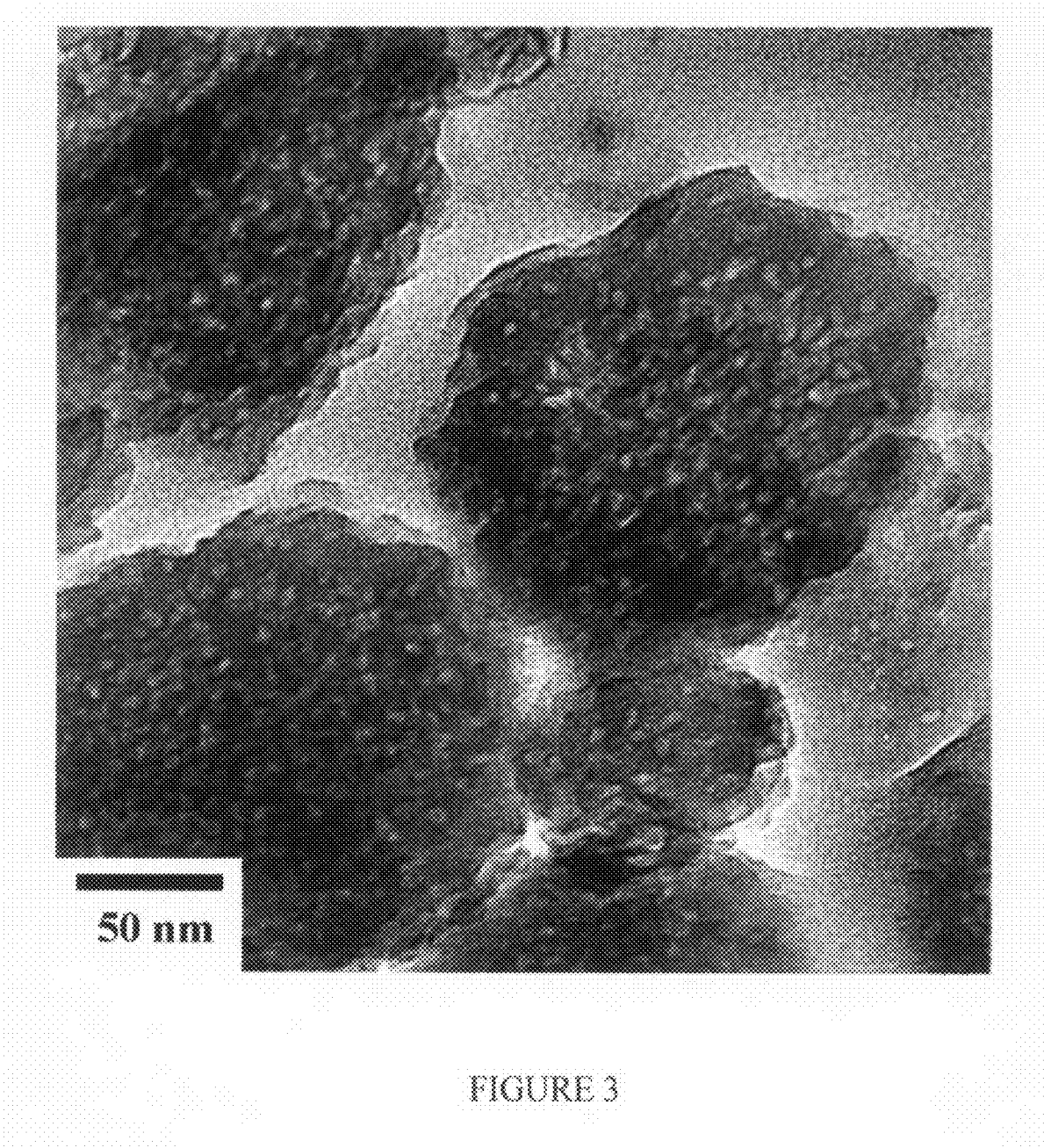
FIG. 3 is a TEM image of a thin-sectioned sample of MSU-MFI zeolite prepared in the presence of the silane-modified polyethyelenimine porogen MP-25000(5). The low contrast regions of the imaged particles identify the intracrystal textural pores.

FIG. 2 provides the textural pore size distributions for MSU-MFI samples prepared in the presence of silane-modified polyethyleneimine porogens of differing molecular weights, namely: (A) MP-600(5); (B) MP-1800(5); (C) MP-10000(5); and (D) MP-25000(5). The BJH pore size distributions were obtained from the adsorption isotherms over the partial pressure range from about 0.10 to about 0.80. For all the samples, the textural pore size distribution is narrow with the majority of pores smaller than 5 nm. The average pore diameter increasing from about 2.0 for the sample made with the lowest molecular weight porogen (MP-600) to about 3.0 for the sample made with the largest porogen in the series (MP-25000). FIG. 3 provides a transmission electron micrograph (TEM) image of a thin-sectioned sample of a typical MSU-MFI zeolite. The lighter contrast regions of the crystalline particles clearly show the presence of textural intracrystal mesopores.

Example 3

This Example illustrates the synthesis of zeolite Y with uniform intracrystal textural pores through the use of the silane-modified polyethylenimine MP-25000(5) as the textural porogen. Colloidal silica (Ludox LS-30), powdered aluminum metal, tetramethylammonium hydroxide (TMAOH), and sodium hydroxide were used as reagents for forming the crystalline zeolite framework.

MP-25000(5) was dissolved in TMAOH. To the resulting solution, was added the powdered aluminum metal and colloidal silica under vigorous stirring. The composition of the reaction mixture was as follows: 1.00 mole $SiO_2$ in the form of colloidal silica; 0.23 $Al_2O_3$ in the form of aluminum metal; 1.44 moles TMAOH; 113 moles water; 0.10 moles of silicon in the form of silane modified polyethyleneimine porogen MP-25000(5). The mixture was then transferred into a Teflon-lined autoclave and heated at 100° C. for 96 hours. The product washed, dried, and calcined at 600° C. for 4 hours. The final product was denoted as MSU-Y.

Figure 4:
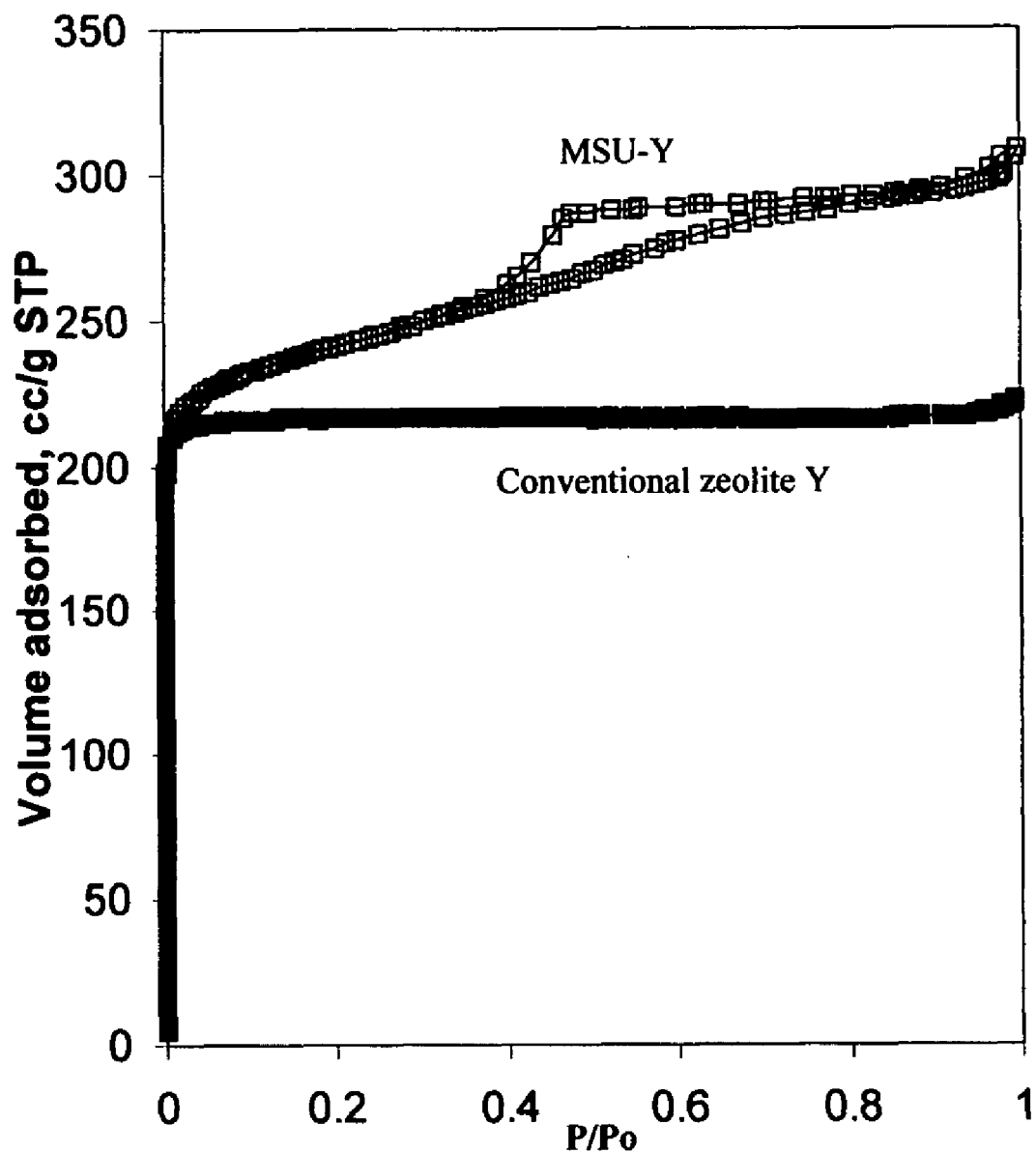
FIG. 4 is the nitrogen adsorption/desorption isotherms for conventional zeolite Y and a MSU-Y zeolite synthesized according to Example 3 in the presence of the textural porogen MP-25000(5).

FIG. 4 provides the nitrogen adsorption/desorption isotherms of the MSU-Y zeolite product in comparison to conventional zeolite Y. The nitrogen uptake by the MSU-Y zeolite in the partial pressure region from about 0.05 and about 0.80 is due to the filling of intracrystal textural pores. As in the case of the conventional zeolite Y, the nitrogen uptake below a partial pressure of about 0.05 is due to the filling of micropores in the framework of the crystalline zeolite. The conventional Y zeolite exhibits little or no additional nitrogen uptake beyond a partial pressure of 0.05 as expected for the absence of textural mesoporosity. Note that for the MSU-Y sample, about 25% of the total nitrogen uptake volume at a partial pressure of about 0.80 is due to filling of the textural intracrystal pores. The liquid pore volume due to the intracrystal textural at this partial pressure is at least 0.1 cc per gram, as estimated by subtracting the pore volume due to the microporous zeolite framework from the total pore volume at this same partial pressure. The liquid pore volume due to intracrystal textural porosity is larger than 0.05 cc per gram, more typically between 0.1 and 0.3 cc per gram and occasionally in excess of 0.5 cc per gram. Moreover, from the isotherms in FIG. 4, more than 95% of the total nitrogen pore volume at a partial pressure of 0.99 is due to the filling of framework micropores and textural mesopores of the zeolite and less than 5% of the total pore volume is due to the filing of extra crystalline textural pores between the zeolite crystals.

Example 4

This Example illustrates the synthesis of mesoporous ZSM-5 using silane-modified Jeffamine surfactants MP-D2000 and MP-D4000 and as the textural porogens. The purpose of the example is to demonstrate that the average textural pore size can be tuned to a value between 3.5 and 5.5 nm while keeping the width of the textural pore size distribution below about 10 nm.

For the preparation of mesoporous MSU-MFI zeolite with MP-D4000 as the porogen, the polymer was dissolved in TPAOH along with ethanol. To the resulting solution was added aluminum isobutoxide as the aluminum source and TEOS as the silicon source under stirring to afford a reaction mixture with the following composition: 1.00 mole of $SiO_2$ in the form of TEOS; 0.01 mole of $Al_2O_3$ in the form of aluminum isopropoxide; 0.37 mole TPAOH; 20 mole of $H_2O$; 8 mole of EtOH from the hydrolysis of TEOS and the addition of neat ethanol; 0.025 mole of silicon in the form of silane modified MP-D4000 porogen. The reaction mixture was then heated to 100° C. for 96 hours. Solid product was collected by filtration, washing, drying followed by calcination at 600° C. for 4 hours.

For the preparation of the MSU-MFI zeolite with MP-D2000 as the textural porogen, the procedure was similar to the procedure described above using MP-D4000, except that the composition of the reaction mixture was as follows: 1.00 mole of $SiO_2$ in the form of TEOS; 0.01 mole of $Al_2O_3$ in the form of aluminum isopropoxide; 0.37 mole TPAOH; 20 mole of $H_2O$; 4 mole of EtOH from the hydrolysis of TEOS; 0.040 mole of silicon in the form of silane modified MP-D2000 porogen and the reaction was carried out at 125° C. for a period of 48 hours.

Figure 5:
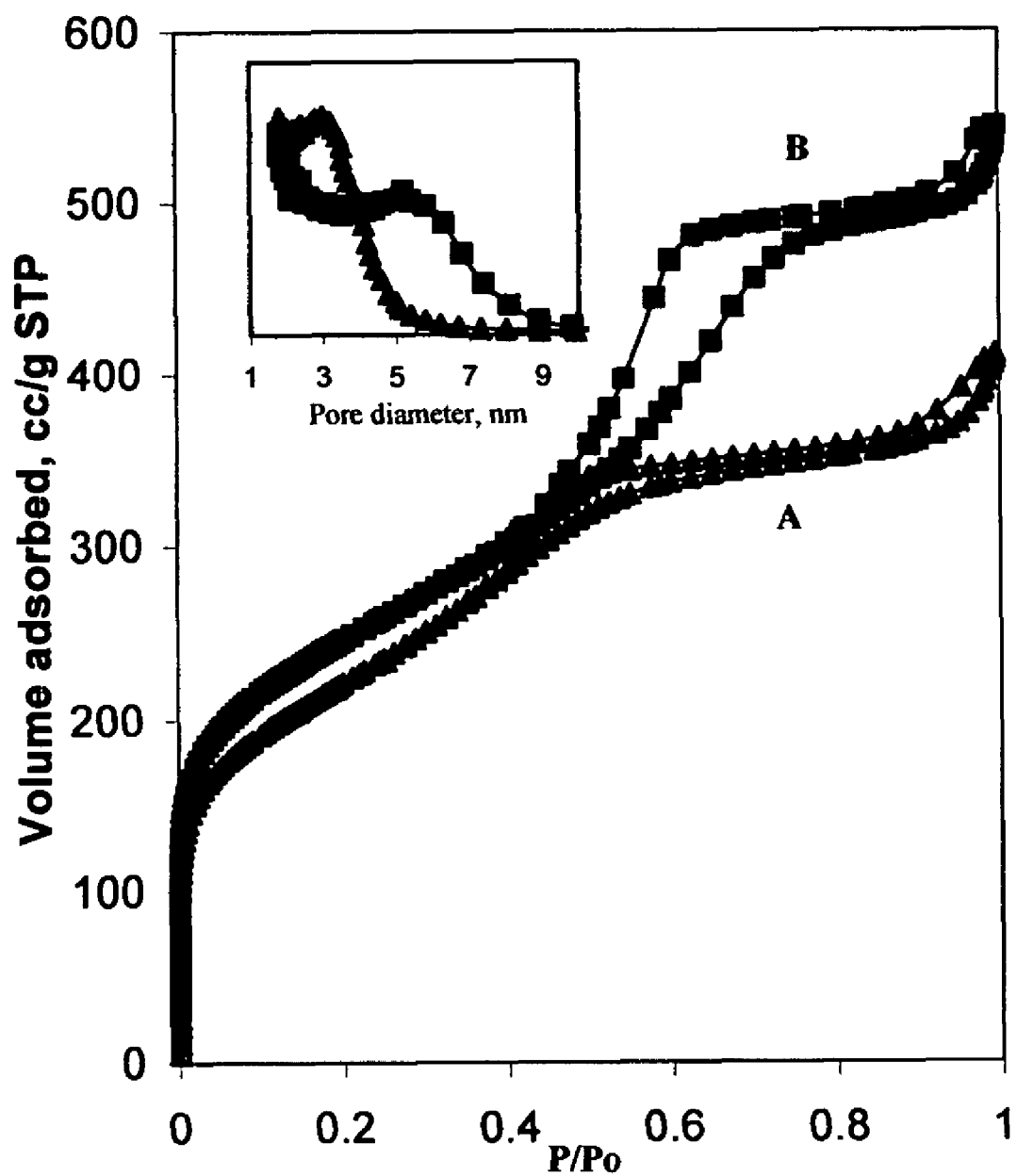
FIG. 5 is the nitrogen adsorption/desorption isotherms and pore size distributions for MSU-MFI zeolites synthesized in the presence of MP-D2000 and MP-D4000 porogens according to the method of Example 4.

FIG. 5 provides the nitrogen adsorption/desorption isotherms of MSU-MFI prepared with silane-modified Jeffamine polymers MP-D4000 and MP-D2000, along with the BJH pore size distributions obtained from the adsorption isotherms in the partial pressure range from about 0.10 to about 0.80. The larger MP-D4000 porogen afforded an average intracrystal textural porosity of about 5.5 nm, whereas the smaller MP-D2000 porogen provided an average textural pore size of about 3.5 nm. For both materials, the intracrystal textural pore size distribution is confined to pore size values below 10 nm. Also, for both materials, the intracrystal textural pore volume below a pore size value of 10 nm, together with the framework pore volume, accounts for 85 to 90% of the total pore volume measured at a partial pressure of 0.99.

Example 5

This Example illustrates the use of a low molecular weight silane-modified porogen for the preparation of a zeolite containing intracrystal textural porosity in the supermicropore range between 1.0 and 2.0 nm. For silane modified Jeffamine D400 polymer, denoted MP-D400, there are four (4) silane groups per mole of polymer, so that the mass of polymer per mole of silane group is near 100.

For the preparation of the MSU-MFI zeolite with MP-D400 as the textural porogen, the procedure was similar to the procedure described in Example 4. The compositions of the reaction mixtures were 1.00 mole of $SiO_2$ in the form of TEOS; 0.01 mole of $Al_2O_3$ in the form of aluminum isopropoxide; 0.37 mole TPAOH; 20 mole of $H_2O$; 4 mole of EtOH from the hydrolysis of TEOS; 0.050 or 0.10 mole of silicon in the form of silane modified MP-D400 porogen. The reaction was carried out at 150° C. for a period of 48 hours. The solid produces were collected by filtration, washed, and dried followed by calcinations at 600° C. for 4 hours.

Both reaction products exhibited Type I nitrogen adsorption isotherms indicative of the presence of microporosity. The BET surface areas determined from the nitrogen adsorption isotherms were 887 and 955 square meters per gram for the MSU-MFI products prepared from reaction mixtures containing 0.050 and 0.10 mole of silicon in the form of silane modified MP-D400 porogen, respectively. These values are substantially larger than the 400 to 600 square meters per gram BET surface areas observed for the mesoporous MSU zeolites prepared in Examples 2, 3, and 4 in the presence of higher molecular weight porogens. Also, conventional MFI zeolite has a surface area of about 350 square meters per gram, due primarily to the micropores of the crystalline framework. Thus, the exceptionally high BET surfaces observed for the products of this Example indicate that the textural pores formed by the small silane modified MP-D400 porogen also are in the micropore range below 2.0 nm, but larger than the 0.55 nm pore size of the crystalline zeolite framework.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A process for forming a calcined zeolite with uniform intracrystal textural pores, which comprises:
   (a) reacting a porogen comprising a silane modified polymer, wherein the silane modified polymer comprises a polymer covalently linked to a silane modifier and the mass of the polymer per mole of the silane modifier is at least 100 grams per mole, in a mixture of an alumina source and a silica source to form a porogen-linked aluminosilicate reaction mixture;
   (b) digesting the reaction mixture to form zeolite crystals with the silane modified polymer porogen occluded within the crystals; and
   (c) removing the occluded intracrystal porogen from the zeolite crystals by calcination to form the calcined zeolite with the uniform intracrystal textural pores.

2. The process of claim 1 wherein the zeolite containing the occluded intracrystal porogen is calcined at a temperature between about 500° and 850° C.

3. The process of claim 1 wherein the porogen is a reaction product of (i) an amine-substituted polymer with at least one NH group and (ii) an aliphatic epoxy silane.

4. The process of any one of claim 1, 2 or 3 wherein the silane modifier is 3-glycidoxypropyl-trimethoxysilane.

5. The process of any one of claim 1, 2, or 3 wherein the polymer is selected from the group consisting of a polyethyenimine and an alpha, omega-polypropylene oxide diamine.

6. The process of claim 1 wherein the uniform intracrystal textural pores of the calcined zeolite are about 1 nm to 10 nm in at least one dimension.

7. The process of claim 6 wherein: (i) the uniform intracrystal textural pores have an average pore size value centered between 1 nm and 10 nm and (i) the uniform intracrystal textural pores have a pore size distribution centered around the average pore size value being between 1 nm and 10 nm.

8. The process of claim 6 or 7 wherein the uniform intracrystal textural pores provide a pore volume of at least 0.05 cc per gram of the calcined zeolite.

9. The process of claim 6 wherein the uniform intracrystal textural pores of the calcined zeolite range in size from 1.2 nm to 2 nm.

10. The process of claim 6 wherein the uniform intracrystal textural pores of the calcined zeolite range in size from 2 nm to 10 nm.

11. The process of claim 6 wherein the uniform intracrystal textural pores of the calcined zeolite have an average pore size of less than about 7 nm.

12. The process of claim 6 wherein the uniform intracrystal textural pores of the calcined zeolite have an average pore size of less than about 5 nm.

13. The process of claim 6 wherein the mass of polymer per mole of silane modifier ranges from 100 grams per mole to 2200 grams per mole.

14. The process of claim 1 wherein the silane modified polymer comprises C—N bonds between the silane modifier and the polymer.

15. The process of claim 1 wherein, prior to reacting the porogen in the mixture of the alumina source and the silica source, the process further comprises:
   (i) reacting an amine-substituted polymer containing at least one NH group with an aliphatic epoxy silane in the presence of an organic solvent to form a reaction product; and
   (ii) separating the organic solvent from the reaction product to form the silane modified polymer.

* * * * *

UNITED STATES PATENT AND TRADEMARK OFFICE
CERTIFICATE OF CORRECTION

| | | |
|---|---|---|
| PATENT NO. | : 7,879,311 B2 | Page 1 of 1 |
| APPLICATION NO. | : 11/799159 | |
| DATED | : February 1, 2011 | |
| INVENTOR(S) | : Thomas J. Pinnavaia and Hui Wang | |

It is certified that error appears in the above-identified patent and that said Letters Patent is hereby corrected as shown below:

In the Specification

In column 1, line 14, delete:

"Not Applicable"

and insert:

-- This invention was made with government support under CHE0211029 awarded by the National Science Foundation. The government has certain rights in the invention. --

Signed and Sealed this
Twenty-third Day of September, 2014

Michelle K. Lee
*Deputy Director of the United States Patent and Trademark Office*